United States Patent [19]

Russell et al.

[11] 4,390,893

[45] Jun. 28, 1983

[54] DIGITAL COLOR MODULATOR

[75] Inventors: Gilbert E. Russell, Hayward; Hee Wong, San Jose, both of Calif.

[73] Assignee: National Semiconductor Corporation, Santa Clara, Calif.

[21] Appl. No.: 216,469

[22] Filed: Dec. 15, 1980

[51] Int. Cl.³ .................... H04N 9/535; G01G 1/28
[52] U.S. Cl. .................................... 358/27; 358/37; 340/701
[58] Field of Search .................. 358/22, 37, 39, 40, 358/147, 166, 162, 167, 80, 284, 36, 21 R, 16, 27; 364/515; 340/701, 703, 723, 728, 742, 791, 744, 748, 793; 273/DIG. 28

Primary Examiner—John C. Martin
Attorney, Agent, or Firm—Paul J. Winters; Gail W. Woodward; Neil B. Schulte

[57] ABSTRACT

An interface circuit for converting a digital signal representing a dot-by-dot color video signal into a NTSC signal compatible with a television antenna input precompensates the digital for limitations in typical NTSC receivers. Various methods and circuits for precompensating the luminance amplitude, chrominance and chrominance amplitude content of the digital signal result in perceivably improved contrast and color purity.

2 Claims, 12 Drawing Figures

Fig_7

Fig_8

Fig_9

Fig_10

Fig_11

Fig_12

DIGITAL COLOR MODULATOR

BACKGROUND OF THE INVENTION

1. Field of the Invention

The present invention relates generally to Digital Color Modulation for interfacing digital logic with a TV set's Radio-Frequency (RF) analog input. More specifically, the present invention relates to a Digital Color Modulator which interfaces between digital logic and the RF input of a conventional TV set adapted for providing well defined color characters and symbols on a dot-by-dot basis.

2. Description of the Prior Art

In 1953 the National Television System Committee (NTSC) established specifications for color television signals. They specified that color defining signals (chrominance signals) would modulate a subcarrier that is approximately 3.58 MHz above brightness-modulated carriers (luminance signals). This permits the separation of the two signals by detectors in a TV set and maintains the compatibility of this new color standard with existing black and white sets. Specifically, black and white sets detect only the luminance signal. In contrast, color TV sets first decode the luminance signal to determine how much light is at a certain point on the screen, then decode the chrominance signal for determination of how much of that light is red, blue and green. However, the definition of a high-resolution pattern of rapidly changing colors requires a high frequency signal, which in turn requires a wide bandwidth. The bandwidth of each TV channel is limited to about 6 MHz, and the chrominance signal is restricted to a 2 MHz bandwidth. Fast color changes over small areas cannot be transmitted in a 2 MHz bandwidth. However, the human eye is unable to perceive color in small viewed areas and the brain "fills in" color from a surrounding area into the small areas. Thus, while smaller areas are transmitted essentially in black and white, the brain "fills in" the proper color, resulting in adequate resolution for color TV graphics being attainable within the bandwidth limitations of the chrominance signals.

Existing video cameras intrinsically provide a considerable degree of spatial filtering which limits the high frequency content of the luminance and chrominance signals. However, when it is desired to interface digital circuits with the NTSC standard, the sudden digital transitions associated with digital signals, which have large high-frequency components, cause cross-channel modulation between the luminance and chrominance signals. Merely low-pass filtering the digital signal is inadequate as this results in a loss of sharp contrast and luminance consistency which are desirable characteristics for the characters and symbols required for TV graphics. Accordingly, it is desirable to have a digital interface for an analog NTSC receiver which provides sharp contrast and luminance consistency for TV graphics.

SUMMARY OF THE INVENTION

In accordance with a preferred embodiment of the present invention a digital interface circuit for a NTSC receiver incorporates Luminance Amplitude Precompensation for boosting the amplitude of individual bright dots and decreasing the amplitude of individual black dots adjacent to individual bright dots, Luminance Pulse-Width Precompensation for extending the dot-clock period of the luminance signal for individual bright dots when the next dot has a reduced luminance, Luminance Slope Precompensation for raising the amplitude of black dots immediately preceding a large increase in luminance amplitude, Advanced Chroma Precompensation for advancing the chrominance signal prior to large low-to-high luminance transitions, Extended Chroma Precompensation for extending the chrominance signal after large high-to-low luminance transitions, Pseudo-Color Enhancement for altering the chrominance of individual low-luminance dots, and Yellow Compensation for altering the chrominance and luminance levels of yellow dots.

BRIEF DESCRIPTION OF THE DRAWINGS

FIGS. 3a, 3b and 3c are illustrations of luminance signals. FIG. 3a illustrates a digital luminance signal as might be provided by a digital circuit. FIG. 3b illustrates the high-frequency attenuation of the digital signal of FIG. 3a by a NTSC receiver. FIG. 3c is an illustration of the luminance signals of FIGS. 3a and 3b after Luminance Amplitude Precompensation in accordance with the preferred embodiment of the present invention.

DETAILED DESCRIPTION OF THE PREFERRED EMBODIMENT

Figure 1:
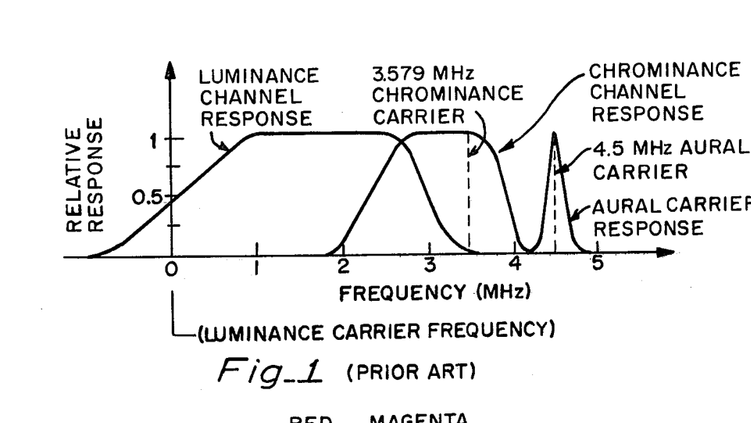
FIG. 1 is an illustration of the response of a typical NTSC receiver to luminance, chrominance and aural signals as a function of frequency.

A typical NTSC receiver can be generalized with regards to its performance characteristics as a function of frequency. FIG. 1 is an illustration of the response of a typical NTSC receiver to luminance, chrominance and aural signals as a function of frequency. The frequency axis shows the luminance carrier signal as the zero frequency. The luminance signal is a vestigial sideband, that is, it is predominantly an upper side-band signal with a "vestige" of the lower side-band, which modulates the luminance carrier. The receiver's luminance channel response has a bandwidth encompassing frequencies from approximately 0–3 MHz relative to the luminance carrier. The receiver's chrominance channel response has a bandwidth encomposing frequencies from approximately 2.0 to 4 MHz. The aural signal is transmitted on a relatively narrow band approximately 4.5 MHz above the luminance carrier. As can be seen by inspection of FIG. 1, the close proximity and overlap of the luminance and chrominance responses may result in cross-channel modulation between the luminance and chrominance signals when high-frequency luminance or chrominance changes are present. High-frequency luminance changes may cause spurious colors or "rainbows" in light areas of the display. High-frequency chrominance changes may cause unwanted luminance variations. Accordingly, it is especially important to limit the high-frequency content of the luminance and chrominance signals applied to the NTSC receiver without degrading the contrast and luminance uniformity of the resulting display.

The preferred embodiment of the present invention provides 40 characters, each having a 6-dot character width, on each horizontal raster of a television display. Thus, there are 240 dots or bits of binary data displayed on each horizontal line. If alternating dots are illuminated, corresponding to the maximum display frequency, the bandwidth of the luminance channel becomes 2.685 MHz. This frequency is low enough to afford some immunity to cross-channel modulation; however, the chrominance response at this frequency may still be substantial in some NTSC receivers and must be compensated for.

Figure 2:
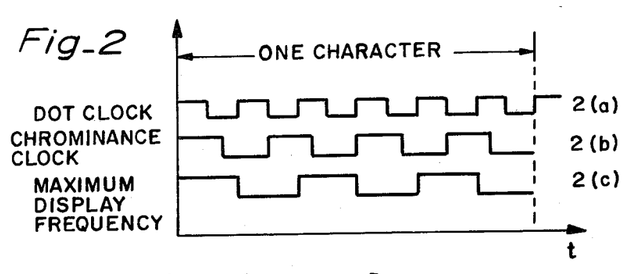
FIG. 2 is an illustration of the dot and chrominance clock signals relative to the maximum display frequency.

To provide a positive clock-edge for each dot, a dot-clock having a frequency of 5.37 MHz is provided. This dot-clock is precisely related to the frequency of the chrominance clock by digital logic. Specifically, the present system has a 14.3 MHz system clock. Dividing this system clock by 4 provides chrominance clock signal of 3.58 MHz. Multiplying the system clock by three-eighths provides the dot-clock of 5.37 MHz. Referring to FIG. 2, there are six dot-clock periods and four chrominance (or "chroma") clock periods for every character.

In the preferred embodiment of the present invention a number of methods and circuits have been implemented to particularly compensate the digital signals for the problems identified with regard to the interface with a NTSC receiver. The following detailed description is divided into sections associated with the major compensation methods and circuits of a digital NTSC interface circuit. Specifically, the following description will describe the methods used for luminance compensation, chrominance compensation and finally, the detailed circuitry implementing the luminance and chrominance compensation and a description of its operation.

Luminance Amplitude Precompensation

The first problem associated with digitally interfacing with an NTSC receiver manifests itself as a loss of contrast in response to rapidly alternating bright and dark dots. Particularly, there is an attenuation of high-frequency luminance signals in a NTSC's RF and IF sections. FIG. 3a is an illustration of a digital high-frequency luminance signal corresponding to rapidly alternating bright and dark dots as might be provided by a digital circuit. Attenuation of the high-frequency components of the digital signal by a NTSC receiver results in the demodulated wave-form illustrated in FIG. 3b. The wide spatial field designated as A has a greater amplitude, this appears brighter than the individual peaks B associated with individual bright dots. Further, the individual dark dots C between the individual bright dots are much brighter than dark spatial field D. To counteract these amplitude variations, a Luminance Amplitude Precompensation technique boosts the amplitude of individual bright dots and decreases the amplitude of individual black dots adjacent to individual bright dots. This increase in the A.C. amplitude of the luminance signal increases the luminance and contrast of individual bright dots. The decrease in the black level amplitudes on both sides of a bright dot also limits color fringing by lowering the luminance of the black background to a level at which color cannot be perceived. FIG. 3c is an illustration of a digital luminance signal (in dotted lines) which has been digitally compen-sated for luminance amplitude precompensation and the resulting response of an NTSC receiver (in solid lines).

Luminance Pulse-Width Precompensation

A second method known as Luminance Pulse-Width Precompensation further increases the luminance of individual high-frequency bright dots and further decreases the cross-channel modulation between the luminance and chrominance signals caused by high-frequency luminance signals. Particularly, when the present circuitry detects a decrease in luminance in the next bit of the luminance signal, the present bit is extended by one-half the dot-clock period. This allows the individual luminance dots to reach a luminance level perceptually equal to the high-luminance of a bright spatial field. Further, by increasing the pulse-width to a 75% duty cycle, the frequency of an alternating bright-dark pattern is separated into two predominant side-bands. The first side-band is a frequency of approximately 1.79 MHz, which is in the middle of the luminance response band and is well removed from the chrominance pass-band. The second side-band, 5.37 Mhz, is also well removed above the total passband, thus, it does not affect either the chrominance or the luminance signals.

Visually, the extended dot is not noticeable at normal viewing distances. Naturally, it causes vertical character segments to be wider than horizontal character segments. However, this effect does not degrade subjective viewing of TV graphics.

Figures 3, 4:
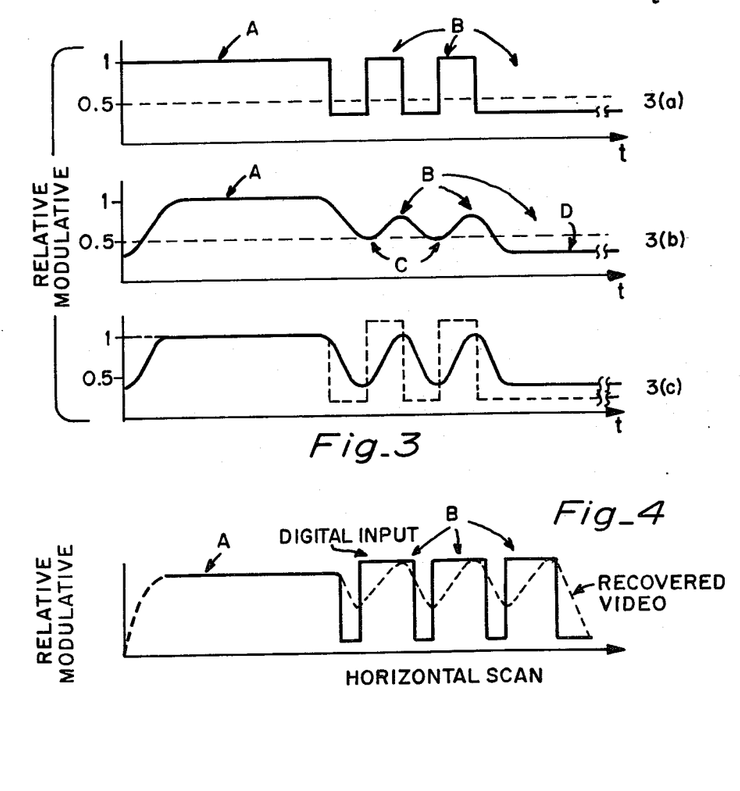
FIG. 4 is an illustration of the luminance signals of FIGS. 3a and 3b after Luminance Pulse-Width and Amplitude Precompensation in accordance with the preferred embodiment of the present invention.

The net effect of Luminance Pulse-Width Precompensation is to increase the DC offset of the net luminance response of the receiver for high frequency luminance changes. The Luminance Amplitude Precompensation provides an AC amplification during high bandwidth luminance changes. Graphically, the signal resulting from Pulse-Width Precompensation and Luminance Amplitude Precompensation is illustrated in FIG. 4. The luminance signal detected by the receiver exhibits an equal average luminance amplitude regardless of the luminance frequency. Particularly, the wide spatial field A and the individual bright dots B appear to have equal luminances. The intersticed black dots appear to be black due to the close proximity to the highly luminant white dots. Further, an additional benefit of these two luminance compensation methods is to provide for an improvement in color purity due to the observed improvement in the uniformity of the luminance levels of spatial fields having varying widths.

Luminance Slope Precompensation

A third luminance compensation method is related to the problem of color fringing caused by rapid dark-to-light transitions. Particularly, the high-frequency digital transition from a dark dot to bright dot cross-modulates the chrominance channel and is interpreted as a color signal. This cross-channel modulation causes a rainbow effect, known as color ringing, in the white areas following such a transition period. Accordingly, a Luminance Slope Precompensation method raises the level of a black dot immediately preceding a large luminance increase so as to decrease the detected DV/DT of the luminance signal. This decrease in the rate of change of the digital signal decreases the bandwidth of the detected luminance signal and decreases the cross-channel modulation and the resulting color fringing.

NTSC Chrominance Signals

The NTSC system encodes color as a phase shift of a 3.58 MHz chrominance signal. Specifically, a color burst of 9 cycles of the 3.58 MHz signal having a reference amplitude is provided with each horizontal line. The phase of this color burst is compared to a subsequent phase of the chrominance carrier to determine the desired color. The amplitude of this color burst is compared to subsequent amplitudes of the chrominance carrier to determine the desired color saturation. In the preferred embodiment of the present invention an eight-phase 3.58 MHz color generator generates signals representing six discrete colors. Particularly, the phase shifts and the corresponding colors are:

0 degrees—yellow
22.5 degrees—color burst
45 degrees—green
90 degrees—not used
135 degrees—cyan
180 degrees—blue
225 degrees—not used
270 degrees—magenta
315 degrees—red

TABLE 1

Figure 5:
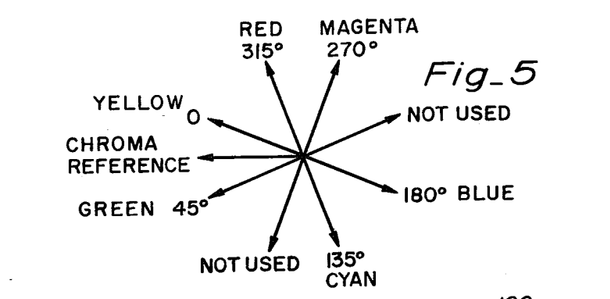
FIG. 5 is a graphical representation of the colors corresponding to various phase shifts of the chrominance signal.

These colors and the corresponding phase shifts are illustrated graphically in FIG. 5.

Advanced Chroma Precompensation

Since there are only four color reference periods for every six dot periods, as shown in FIG. 2, the receiver's color demodulator may not always have enough time to generate the necessary decoded color for a single colored dot. A first color compensation method designated "Advance Chroma Precompensation" advances the selection of the decoded chroma phase by half a dot-clock prior to a low-to-high luminance transition. This allows the receiver's color demodulator time to track the chrominance signal when a luminance transition occurs. The advanced chroma signal is not apparent to the viewer because of the reduced color perception in low luminance color areas. Further, the advanced locking of the demodulator with the color carrier prevents the color demodulator from erroneously locking onto the phase of the high-frequency luminance transition.

Extended Chroma Precompensation

A second color compensation method designated "Extended Chroma Precompensation" extends the chrominance signal phase for one-half a dot-clock after a high-to-low luminance transition. Similar to the Advance Chroma Precompensation, this method holds the receiver's color demodulator in lock during the high-frequency luminance transition and prevents trailing edge color distortion that might otherwise occur. Again, the viewer does not notice the extension of the color into the low luminance area.

Pseudo-Color Enhancement

A third color compensation method known as subjective Psuedo-Color Enhancement compensates for the small chrominance signal bandwidth by providing luminance changes where high-frequency color changes are desired. Specifically, when a background (low luminance) color dot occurs between two foreground (high luminance) color dots, the chrominance of the background color dot is unchanged but its luminance level is lowered to the luminance level at a normal background color dot. The resulting background color dot appears to the viewer as having the background color. Specifically, for this small area the brain "fills in " the background color having an equal luminance from the background area.

Yellow Compensation

Finally, the color yellow is considered as a special case due to its apparently high luminance. To correct for this phenomenon, a "yellow compensation" method reduces the chrominance level while concurrently increasing the luminance level during a yellow dot period. This produces a yellow dot which has the same apparent luminance as dots of the other colors.

DETAILED CIRCUIT DESCRIPTION

Figure 6:
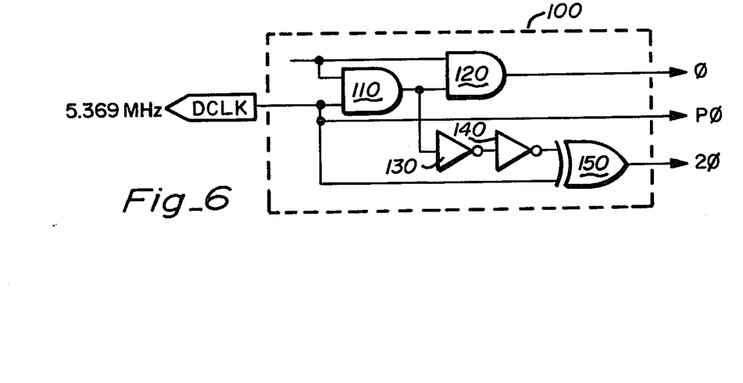
FIG. 6 is a detailed schematic diagram of an internal clock circuit.
Figure 7:
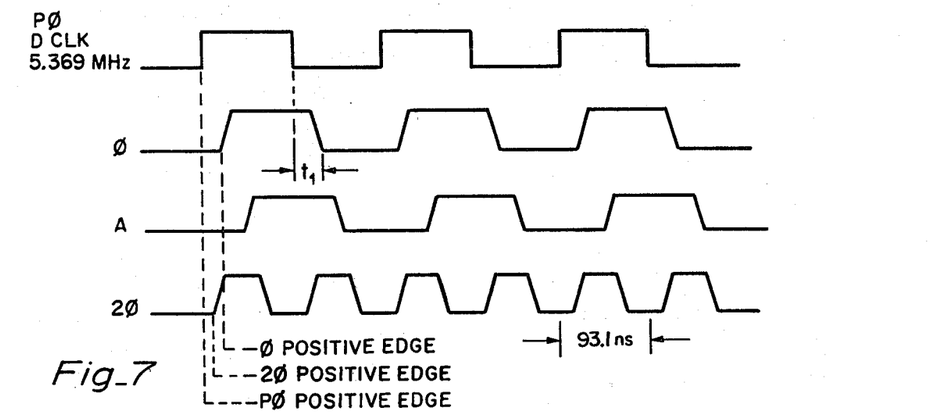
FIG. 7 is an illustration of the waveforms of the clock signals provided by the clock circuit of FIG. 6.

FIG. 6 is a detailed schematic diagram of internal clock circuit 100. The internal clock circuit generates three internal clock signals $\phi$, P$\phi$, and 2$\phi$ in response to an external clock signal DCLK. External clock signal DCLK is applied to one of the inputs of AND gate 110 and has a frequency of 5.3693175 MHz. The $\phi$ clock signal is used as the main system clock. This signal is delayed by the gate delay of AND gates 110 and 120 to provide a signal preferably delayed 10 nanoseconds with respect to the DCLK signal. The P$\phi$ clock signal is simply the unprocessed DCLK signal. The P$\phi$ signal is used when an advanced positive clock edge relative to the $\phi$ clock signal is required. The 2$\phi$ clock signal is generated by frequency doubling the P$\phi$ clock by the use of inverters 130 and 140 and exclusive OR gate 150. The gate delays of the devices in internal clock circuit 100 are selected such that the positive edge of the P$\phi$ signal occurs first, followed by the 2$\phi$ signal positive edge, and finally the $\phi$ signal positive edge. Further, the external clock signal DCLK preferably has a duty cycle of 50% to insure that alternating positive edges of the the 2$\phi$ signals are characterized by accurate one-half bit shift delays. The waveforms of these signals, including external clock signal DCLK, the intermediate signal A appearing at the output of inverter 140, and system clock signals $\phi$ and 2$\phi$ are illustrated in the waveform diagrams of FIG. 7.

Figure 8:
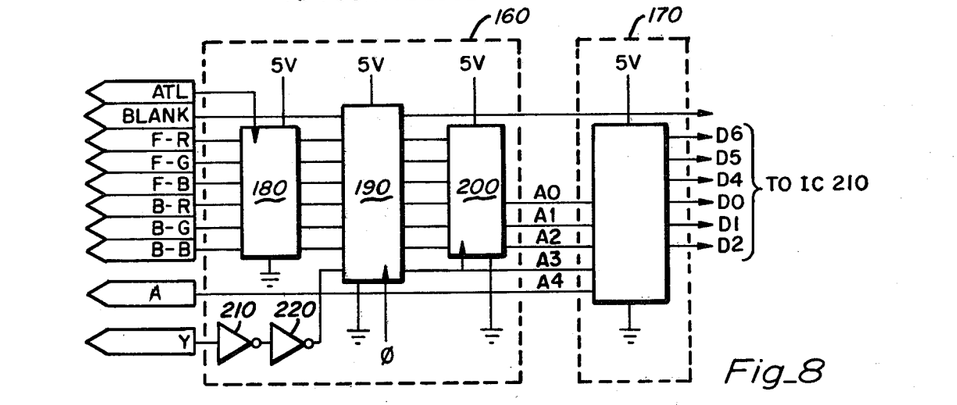
FIG. 8 is a detailed schematic diagram of a Color Attribute Multiplexer and a Luminance Pattern and Color Encoder.

FIG. 8 is a detailed schematic diagram of the color attribute multiplexer 160 and the luminance pattern and color encoder 170. The color attribute multiplexer 160 receives attribute codes and character generator video data from external CRT controller video RAM circuitry. Specifically, the color attribute multiplexer 160 receives background and foreground codes as defined in Table 2. For example, the foreground attribute inputs F-R, F-G and F-B correspond to the "foreground red", "foreground green" and "foreground blue" bits of the table.

TABLE 2

| BACKGROUND CODES | | FOREGROUND CODES | |
|---|---|---|---|
| 000 | BLACK | 000 | BLACK |
| 001 | BLUE | 001 | BLUE |
| 010 | GREEN | 010 | GREEN |
| 011 | CYAN | 011 | CYAN |
| 100 | RED | 100 | RED |
| 101 | MAJENTA | 101 | MAJENTA |
| 110 | YELLOW | 110 | YELLOW |
| 111 | WHITE | 111 | WHITE |

These signals are multiplexed into four data signals on address lines A0, A1, A2, and A3. The specific levels of these signals are defined in Table 3, the color attribute multiplexer data format.

TABLE 3

| A3 | A2 | A1 | A0 | ASSIGNMENT |
|---|---|---|---|---|
| 0 | 0 | 0 | 0 | BLACK DOT |
| 0 | 0 | 0 | 1 | BACKGROUND BLUE DOT |
| 0 | 0 | 1 | 0 | BACKGROUND GREEN DOT |
| 0 | 0 | 1 | 1 | BACKGROUND CYAN DOT |
| 0 | 1 | 0 | 0 | BACKGROUND RED DOT |
| 0 | 1 | 0 | 1 | BACKGROUND MAGENTA DOT |
| 0 | 1 | 1 | 0 | BACKGROUND YELLOW DOT |
| 0 | 1 | 1 | 1 | WHITE DOT |
| 1 | 0 | 0 | 0 | BLACK DOT |
| 1 | 0 | 0 | 1 | FOREGROUND BLUE DOT |
| 1 | 0 | 1 | 0 | FOREGROUND GREEN DOT |
| 1 | 0 | 1 | 1 | FOREGROUND CYAN DOT |
| 1 | 1 | 0 | 0 | FOREGROUND RED DOT |
| 1 | 1 | 0 | 1 | FOREGROUND MAGENTA |
| 1 | 1 | 1 | 0 | FOREGROUND YELLOW |
| 1 | 1 | 1 | 1 | WHITE DOT |

The signal on address line A3 is advanced by one clock period of clock signal 0 (one dot-clock period) with respect to address signals A0–A2. Accordingly, a high level signal on address line A3 indicates that the next dot will be a foreground (high luminance) dot. A low level signal on address line A3 indicates that the next dot will be a background (low luminance) dot. The signals on address lines A0–A2 designate the color of the present dot. Specifically, signals on address lines A0, A1, and A2 represent the colors blue, green and red, respectively, as indicated in Table 3

The color attribute multiplexer 160 comprises a 6-bit D-type latch 180, an 8-bit D-type latch 190, and a quad 2-line to 1-line data selector/multiplexer 200. Inverters 210 and 220 are designed to have gate delays equivalent to the propagation delay through PPN generator 180. Thus, the inputs to the integrated circuit 190 from PPN generator 180 and pin y are received at the same time.

Luminance pattern and color encoder 170 comprises a 32×6 ROM coupled to address lines A0–A4. Address line A4 is used to reverse the color phase for PAL operation. For NTSC operation address line A4 is grounded. Encoder 170 produces outputs on data lines D0–D2 and D4–D6 in response to signals on the address lines A0–A4. Specifically, data line D6 has a high level output if the present dot on address lines A0–A2 is yellow. Data lines D5 and D4 indicate the luminance of the present dot as shown below in Table 4. Data lines D0–D2 indicate the color of the present dot in response to the signals on address lines A0–A2 and PAL select line A4 as shown in Table 4.

TABLE 4

| D2 | D1 | D0 | COLOR | D5 | D4 | DOT TYPE |
|---|---|---|---|---|---|---|
| | | | NTSC (A4 = 0) | | | |
| 1 | 1 | 1 | GREEN | 0 | 0 | BLACK DOT |
| 1 | 1 | 0 | NOT USED | 0 | 1 | WHITE DOT |
| 1 | 0 | 1 | CYAN | 1 | 0 | BACKGROUND |
| 1 | 0 | 0 | BLUE | | | FOREGROUND |
| 0 | 1 | 0 | MAGENTA | | | |
| 0 | 0 | 1 | RED | | | |
| 0 | 0 | 0 | YELLOW | | | |
| | | | PAL (A4 = 1) | | | |
| 1 | 1 | 1 | RED | | | |
| 1 | 1 | 0 | MAGENTA | | | |
| 1 | 0 | 1 | NOT USED | | | |
| 1 | 0 | 0 | BLUE | | | |
| 0 | 1 | 1 | CYAN | | | |
| 0 | 1 | 0 | NOT USED | | | |
| 0 | 0 | 1 | GREEN | | | |
| 0 | 0 | 0 | YELLOW | | | |

Figure 9:
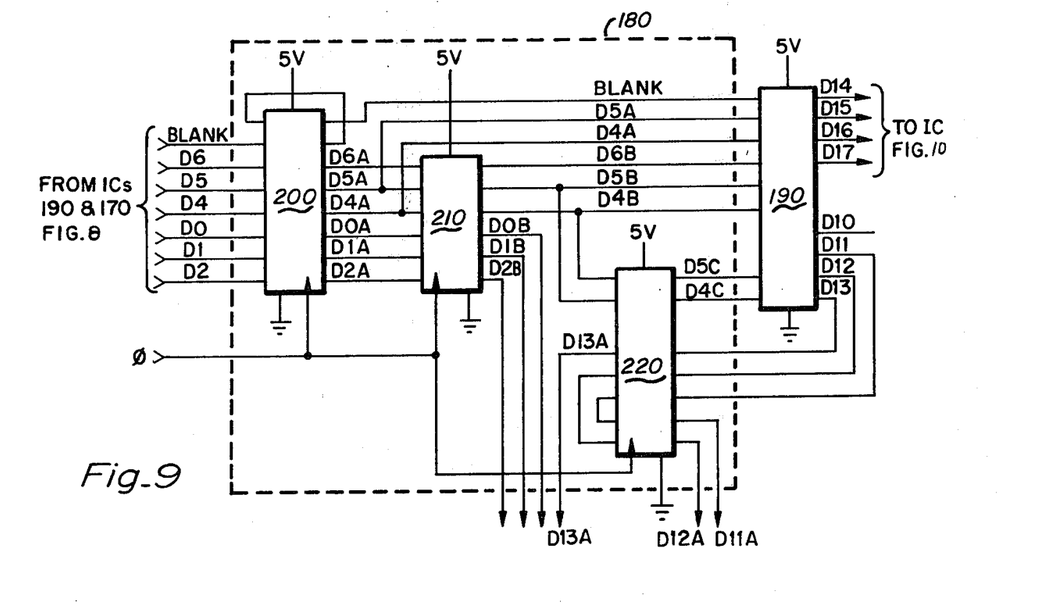
FIG. 9 is a detailed schematic diagram of a PPN Generator and a Bit Pattern and Color Decoder in accordance with the preferred embodiment of the present invention.

FIG. 9 is a detailed schematic diagram of Past/-Present/Next (PPN) generator 180 and bit pattern and color decoder 190. PPN generator 180 comprises three pipelined "D" type flipflops 200, 210 and 220 clocked by the 0 clock signal. Flipflop 200 is coupled to receive data lines D6–D4 and D0–D2 from encoder 170 and data line BLANK from IC 190. Flipflops 200, 210 and 220 provide output signals delayed in phase by one dot-clock period with respect to the signals applied to their inputs. For example, signal D6 is delayed by one dot-clock period in flipflop 200 to provide a signal on line D6A. Flipflop 210 delays the signal on line D6A and provides a signal delayed another dot-clock period on line D6B.

Bit pattern and color decoder 190 comprises a 256*7 ROM. Decoder 190 is coupled to data lines D5A and D4A indicating the dot type of the next bit in accordance with Table 4. Data lines D5B and D4B indicate the dot type of the present bit, and data lines D5C and D4C indicate the dot type of the past bit. The signal on data line D6B indicates whether the present dot is yellow.

In operation, if BLANK is high, the output signals on lines D10–D17 are forced low, denoting no chroma change, no chroma output and a blanking luminance level. Otherwise, the chroma phase, chroma amplitude and luminance amplitude signals from decoder 190 are functions of the color and luminance of past, present, and next bits. Definitions of these signals are given in Table 5 and the specific ROM listing is given in Table 6 for values of the luminance amplitude and Table 7 for the chroma phase and amplitude. Output lines D14–D17 provide a 4-bit digital luminance signal as indicated in Tables 5 and 6.

TABLE 5

| LUMINANCE AMPLITUDE D17(MSB),D16,D15,D14 | LEVELS | LUMINANCE MODULATION |
|---|---|---|
| 9 | White Deviation Level | 20% |
| 8 | White Reference Level & Foreground | 25% |

TABLE 5-continued

| LUMINANCE AMPLITUDE D17(MSB),D16,D15,D14 | LEVELS | LUMINANCE MODULATION |
|---|---|---|
| | Yellow Reference Level | |
| 7 | Foreground Yellow Level & Foreground Deviation Level | 30% |
| 6 | Foreground Color Reference Level (Except Yellow) | 35% |
| 5 | Background Deviation Level | 40% |
| 4 | Background Yellow Level | 45% |
| 3 | Background Color Reference Level | 50% |
| 2 | Black Level (Deviation Level) | 65% |
| 1 | Black Level (Reference Black) | 70% |
| 0 | Blank Level | |

TABLE 6

| P | P | N | LUMINANCE AMPLITUDE NOT YEL | YEL | P | P | N | LUMINANCE AMPLITUDE NOT YEL | YEL |
|---|---|---|---|---|---|---|---|---|---|
| B | B | B | 1 | N/A | * | B | B | 0 | N/A |
| B | B | W | 2 | N/A | * | B | W | 1 | N/A |
| B | B | * | 0 | N/A | * | B | * | 0 | N/A |
| B | B | C | 0 | N/A | * | B | C | 0 | N/A |
| B | W | B | 9 | N/A | * | W | B | 9 | N/A |
| B | W | W | 8 | N/A | * | W | W | 8 | N/A |
| B | W | * | 9 | N/A | * | W | * | 9 | N/A |
| B | W | C | 9 | N/A | * | W | C | 9 | N/A |
| B | * | B | 4 | 5 | * | * | B | 3 | 4 |
| B | * | W | 4 | 5 | * | * | W | 3 | 4 |
| B | * | * | 3 | 4 | * | * | * | 3 | 4 |
| B | * | C | 3 | 4 | * | * | C | 2 | 3 |
| B | C | B | 7 | 8 | * | C | B | 8 | 9 |
| B | C | W | 7 | 8 | * | C | W | 7 | 8 |
| B | C | * | 7 | 8 | * | C | * | 8 | 9 |
| B | C | C | 6 | 7 | * | C | C | 7 | 8 |
| W | B | B | 2 | N/A | C | B | B | 0 | N/A |
| W | B | W | 1 | N/A | C | B | W | 1 | N/A |
| W | B | * | 1 | N/A | C | B | * | 0 | N/A |
| W | B | C | 1 | N/A | C | B | C | 0 | N/A |
| W | W | B | 8 | N/A | C | W | B | 9 | N/A |
| W | W | W | 8 | N/A | C | W | W | 8 | N/A |
| W | W | * | 8 | N/A | C | W | * | 9 | N/A |
| W | W | C | 8 | N/A | C | W | C | 9 | N/A |
| W | * | B | 4 | 5 | C | * | B | 4 | 4 |
| W | * | W | 3 | 4 | C | * | W | 3 | 3 |
| W | * | * | 3 | 4 | C | * | * | 2 | 3 |
| W | * | C | 3 | 4 | C | * | C | 2 | 3 |
| W | C | B | 7 | 8 | C | C | B | 6 | 7 |
| W | C | W | 3 | 4 | C | C | W | 3 | 4 |
| W | C | * | 7 | 8 | C | C | * | 7 | 8 |
| W | C | C | 3 | 4 | C | C | C | 6 | 7 |

NOTE:
"B" = Black Dot
"W" = White Dot
"*" = Background Color Dot
"C" = Foreground Color Dot

TABLE 7

| | P | P | N | CHANGE | CHROMA LEVEL |
|---|---|---|---|---|---|
| 1. | X | B | B | NO | 0% |
| 2. | X | B | W | NO | 0% |
| 3. | X | B | * | YES | 12.5% |
| 4. | X | B | C | YES | 25% |
| 5. | X | W | B | NO | 0% |
| 6. | X | W | W | NO | 0% |
| 7. | B | W | * | YES | 0% |
| 8. | W | W | * | YES | 12.5% |
| 9. | * | W | * | YES | 0% |
| 10. | C | W | * | YES | 0% |
| 11. | B | W | C | YES | 12.5% |
| 12. | W | W | C | YES | 25% |
| 13. | * | W | C | YES | 12.5% |
| 14. | C | W | C | YES | 12.5% |
| 15. | B | * | B | NO | 25% (Yellow = 12.5%) |
| 16. | W | * | B | NO | 12.5% (Yellow = 0%) |
| 17. | * | * | B | NO | 12.5% (Yellow = 0%) |
| 18. | C | * | B | NO | 12.5% (Yellow = 0%) |
| 19. | N* | * | W | NO | 12.5% (Yellow = 0%) |
| 20. | * | * | W | NO | 12.5% (Yellow = 0%) |
| 21. | X | * | * | YES | 12.5% (Yellow = 0%) |
| 22. | X | * | C | YES | 12.5% (Yellow = 0%) |
| 23. | X | C | B | NO | 25% (Yellow = 12.5%) |
| 24. | X | C | W | NO | 25% (Yellow = 12.5%) |
| 25. | X | C | * | NO | 25% (Yellow = 12.5%) |
| 26. | X | C | C | YES | 25% (Yellow = 12.5%) |

NOTE:
Following are the Abbreviations Used in Table:
"P P N" = Past/Present/Next Bit Pattern
"Change" = New Color coding being latched into the chroma phase selector. Chroma phase will change in the middle of the present dot while the selected color phase is the phase for the next dot.
"Chroma Level" = Peak to Peak swing reference to I.R.E. Standard.

Line D13 provides a color change signal in accordance with Table 7 which selectively causes chroma select circuit 430 (FIG. 12) to latch an updated color code into color control and gating circuit 420 (FIG. 12) from flip-flop 210 output lines D2B, D1B and D0B. This color code corresponds to the color code on lines D2, D1 and D0 as defined in Table 4 except that it is delayed two clock periods.

Lines D12 and D11 provide the chroma level control signals in accordance with Table 7. Specifically, the signals on these lines are:

| D12 | D11 | CHROMA LEVEL |
|---|---|---|
| 0 | 0 | Zero chroma (0%) |
| 1 | 0 | 1 unit of chroma (12.5%) |
| 1 | 1 | 2 units of chroma (25%) |

Figure 10:
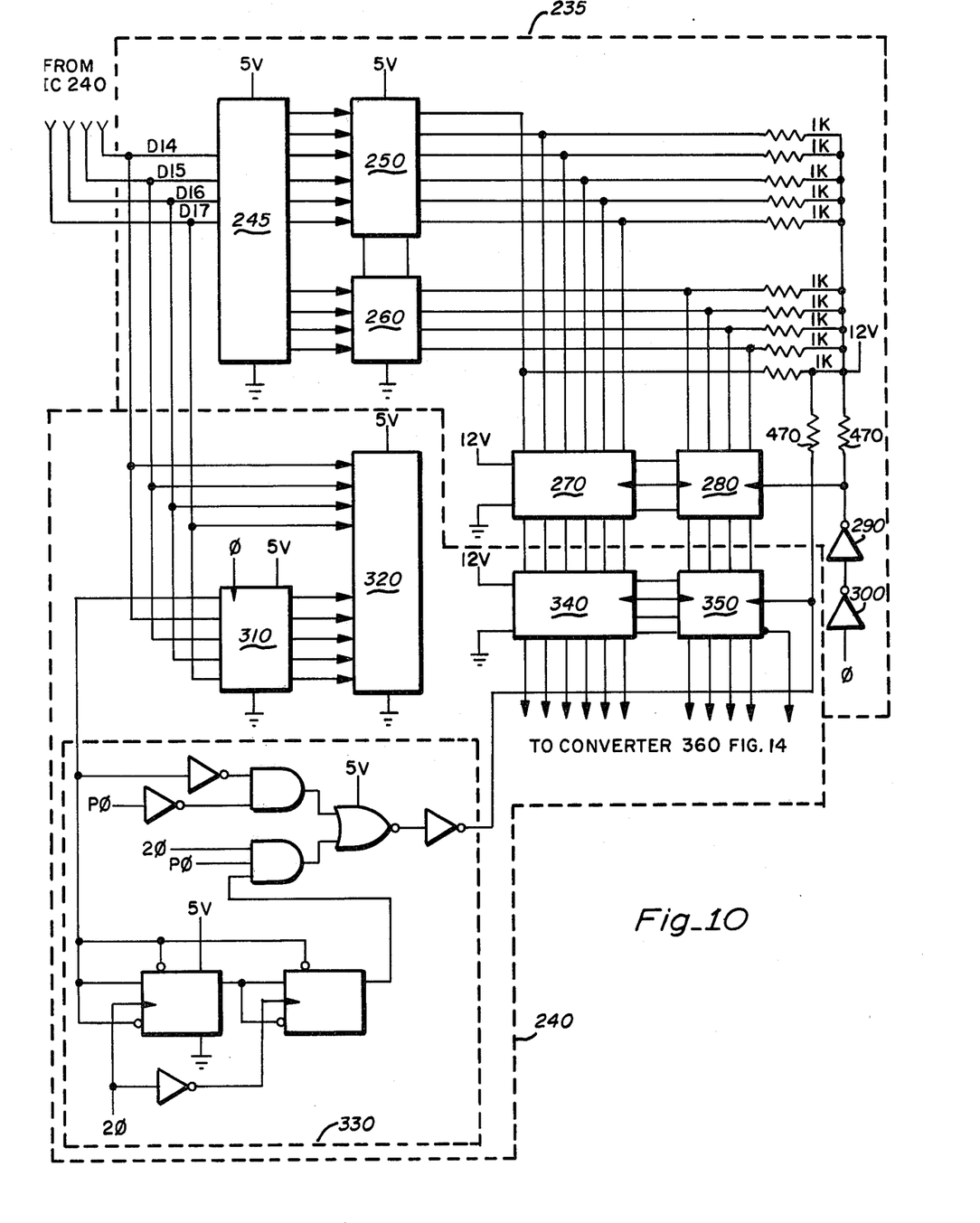
FIG. 10 is a detailed schematic diagram of a Luminance decoder and a Luminance Pulse Width Modifier in accordance with the preferred embodiment of the present invention.

Luminance decoder 235 and luminance pulse width modifier 240 are illustrated in detailed schematic diagram FIG. 10. Luminance level signals D14–D17 are coupled to decoder 245 which decodes the multiplexed signal and provides a signal on one of its ten output lines in response to the level of the decoded signal. These signals are then translated to twelve (12) volt signals by integrated circuits 270 and 280 and the associated 1K and 470 ohm resistors.

Modifier 240 of FIG. 10 performs the pulse width modifications associated with the Luminance Pulse-Width Precompensation. Luminance level signals D14–17 are coupled to IC's 310 and 320, which compare past and present luminance levels. If the present dot has the same or greater luminance than the past dot, clocking circuitry 330 provides a clock signal to pipeline flipflops 340 and 350 at the normal rate of 186 ns per bit (2.685 MHz). However, if a decreasing luminance is detected, clocking circuitry 330 delays the clock signal to flipflops 340 and 350 by one-half a 2.685 MHz clock period, which extends the present high luminance dot for one-half a period.

Figure 11:
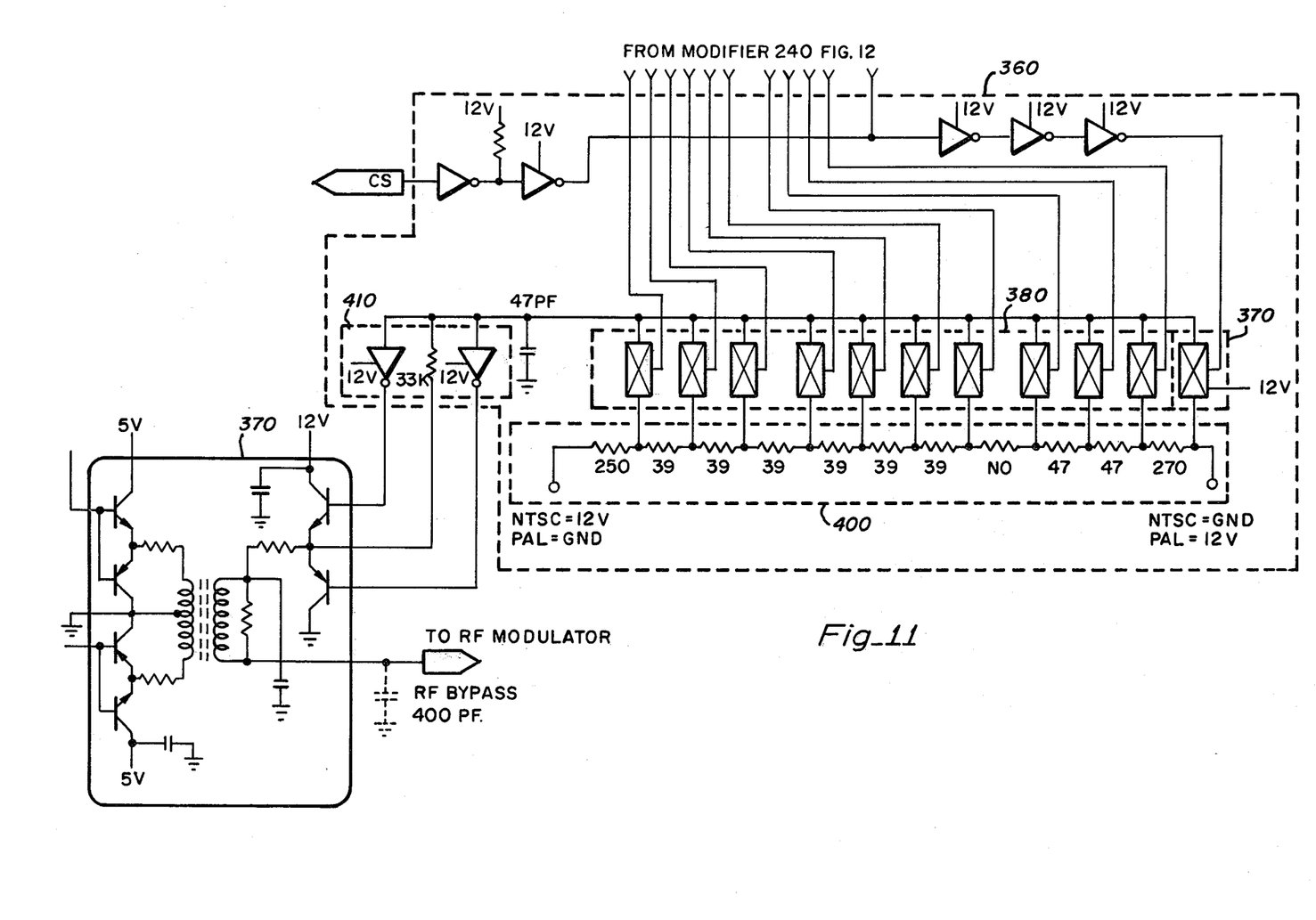
FIG. 11 is a detailed schematic diagram of the Luminance Digital-to-Analog Converter, and the Luminance/Chrominance Mixing Circuit of the preferred embodiment of the present invention.

FIG. 11 is a detailed schematic diagram of luminance digital-to-analog converter 360 and luminance/chrominance mixing circuit 370. A set of ten (10) analog switches 380 are coupled to receive the luminance level signals from modifier 240. An eleventh analog switch 390 is coupled for inserting the lower NTSC (or higher PAL) amplitude composite synchronizing pulses in response to signals on the CS external input. These analog switches are coupled to resistor ladder 400 which is coupled between the terminals of a 12-volt supply. These switches are also coupled to a power buffer 410 which provides the composite video analog luminance signal.

Figure 12:
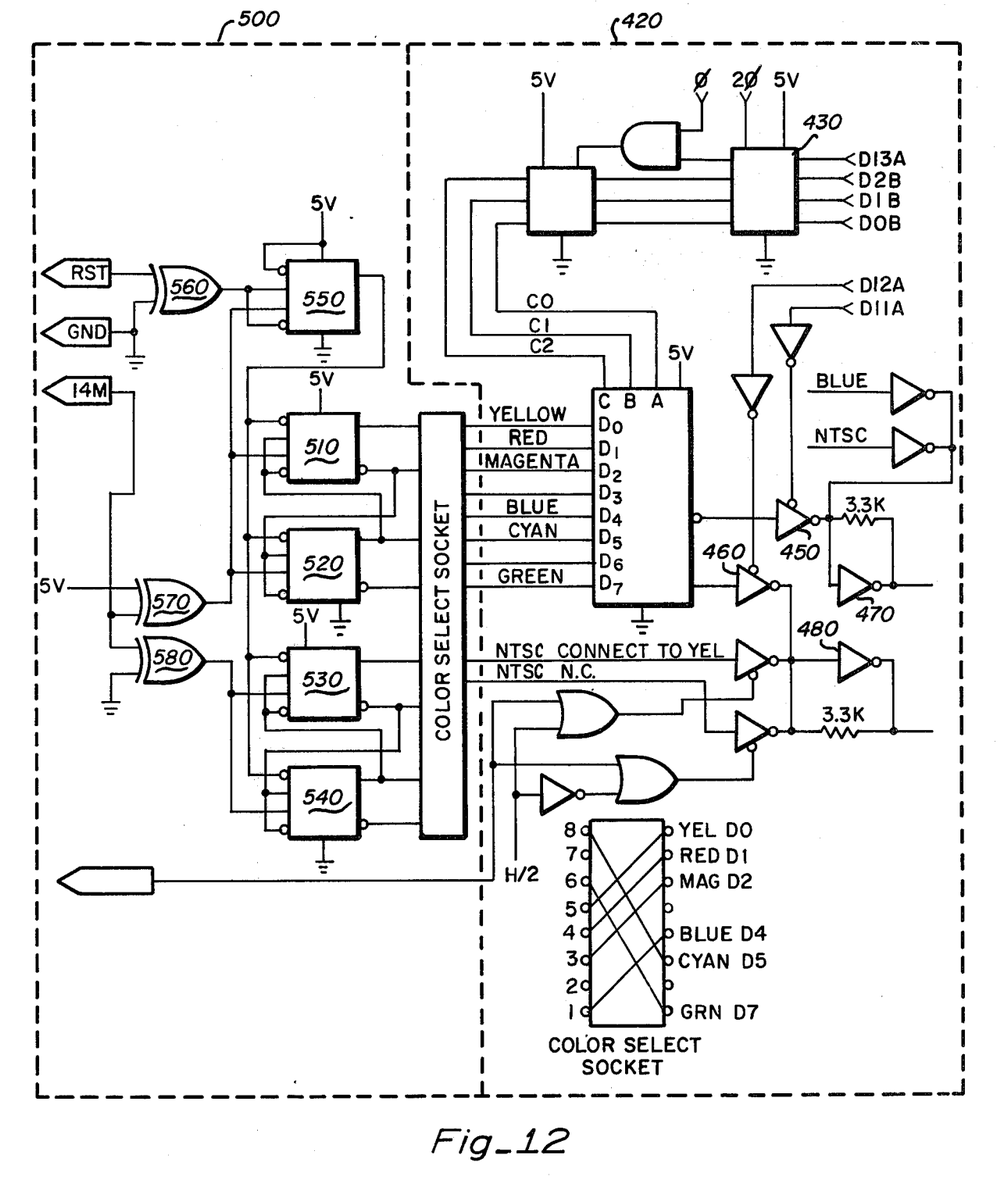
FIG. 12 is a detailed schematic diagram of the Color Control and Gating Circuit and the Eight-Phase Color Frequency Generator of the preferred embodiment of the present invention.

FIG. 12 is detailed schematic diagram of color control and gating circuit 420. A chroma select circuit 430 receives signals on lines D0B, D1B and D2B from past/present/next generator 180, indicating the color of the present bit. The chroma select circuit is also coupled to receive a color change signal on line D13A and chrominance amplitude control signals on lines D12A and D11A. The chrominance amplitude control signals are coupled to tri-state control inputs of inverters 450 and 460 for providing three levels of chroma output. Specifically, the chroma levels as provided by PPN generator 180 are given in Table 7.

Tri-state inverters 450 and 460 are coupled to CMOS-inverters 470 and 480 respectively for generating chroma waveforms similar to conventional NTSC chroma phase signals. These waveforms are desirable for driving a chroma-mixing transformer because DC charging and discharging slopes are not coupled to the luminance channel. The CMOS inverters are driven rail-to-rail at a phase of 3.579 MHz in response to the chroma being enabled.

Chroma reference gating circuit 490 gates one of eight phases to the CMOS inverters 470 and 480. A signal applied to input CBG (Color Burst Gate) enables the reference chroma burst phase signal.

Eight-phase color frequency generator 500 provides eight color frequency signals of varying phases in response to an external 14.31818 MHz clock (3,579545 *4) applied to input 14 M. Each signal varies by 45 degrees in phase with respect to the sequent phase. Six color hues have been assigned to six of the eight signals. Generator 500 comprises four "D" type flipflops 510, 520, 530 and 540, one master flipflop 550, and three exclusive-OR gate 560, 570 and 580. The master reset 550 sets the "D" type flipflops to a predefined sequence in response to an external power on pulse on input RST. The relationship between phases and colors is given below in Table 8.

TABLE 8

| COLOR | DEGREES PHASE FROM BURST REFERENCE |
|---|---|
| CHROMA REFERNECE | 0 |
| YELLOW | 12 |
| RED | 57 |
| MAJENTA | 102 |
| (NOT USED) | 147 |
| BLUE | 192 |
| CYAN | 237 |
| (NOT USED) | 282 |
| GREEN | 327 |

The yellow phase is used for the color burst reference signal which provides a final composite video color burst whose phase is near yellow.

Referring to FIG. 11, luminance/chrominance mixing circuit 370 utilizes a 10 MM-three-winding transformer having two of the windings connected in series with a grounded center-tap. Two of the windings are connected in series with the center tap to ground. The two hot points are driven by the bi-phase chroma frequency buffers (TR1 thru TR4). Three levels of chroma are obtained by tri-stating the circuit on and off. The third winding serves two purposes, first, it sums the chroma signals from the former two windings and superimposes the output onto the liminance channel, secondly, with two capacitors connected to its terminals, it performs a low-pass filter function, which band-limits the luminance and chrominance signals. The halfpower point of the filter is set at approximately 2.8 MHz. The two capacitors are chosen in such a way that the value of the output capacitor is about one-fifth of the input capacitor, thus, the majority of the chroma signal will be delivered to the RF modulator preventing back-feeding of the luminance buffer. This reduces intermodulation distortion at the luminance buffer amplifier. The resistors around the mixing transformer lower the "Q" of the filter network, which eliminates possible overshoot excursions from affecting the RF modulator.

While the invention has been particularly taught and described with reference to the preferred embodiments, those versed in the art will appreciate that minor modifications in form and detail may be made without departing from the spirit and scope of the invention. Accordingly, all such modifications are embodied within the scope of this patent as properly come within my contribution to the art and are particularly pointed out by the following claims.

We claim:

1. A method for precompensating a digital signal representing a dot-by-dot color video signal for the apparent high luminance of yellow in a NTSC format comprising the steps of:
   detecting a yellow dot;
   reducing the chrominance level of the yellow dot; and
   increasing the luminance level during the period of the yellow dot.

2. A method as in claim 2 further comprises the step of converting the digital signal to a NTSC signal.

* * * * *